Aug. 6, 1940.　　　A. BERKOBEN ET AL　　　2,210,522
SWING SUPPORT
Original Filed Oct. 24, 1935
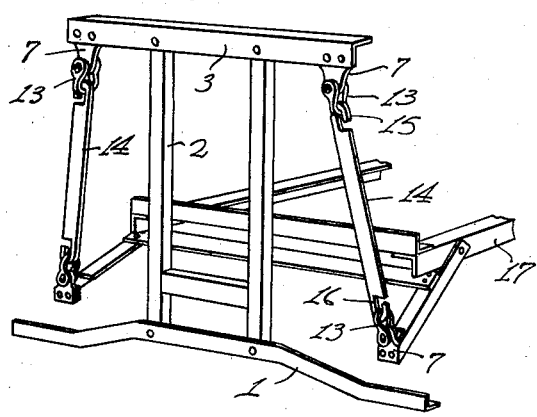
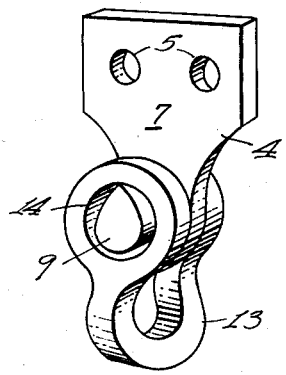
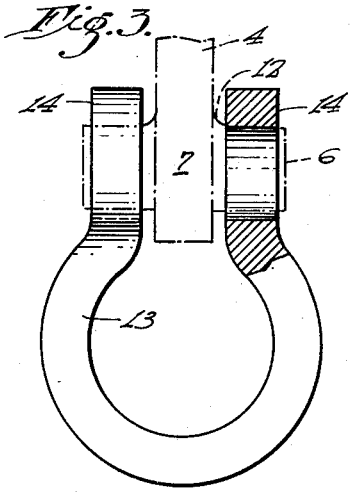
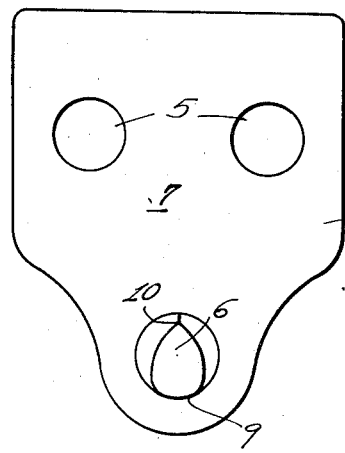
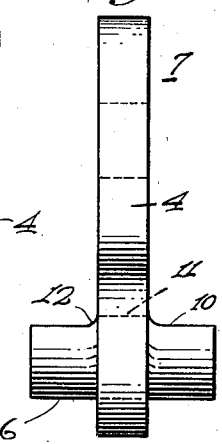
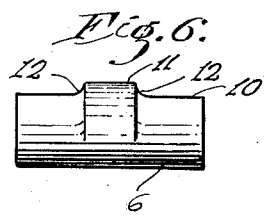
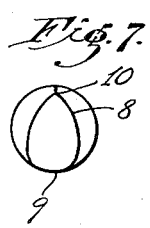
WITNESSES —
E. C. Leiding.
E. C. Leiding.
INVENTOR
August Berkoben and
Eugene A. Moritz
BY
Paul E. Friedemann
ATTORNEY Patented Aug. 6, 1940

2,210,522

UNITED STATES PATENT OFFICE 2,210,522

SWING SUPPORT

August Berkoben, Forest Hills, and Eugene A. Moritz, East McKeesport, Pa.

Substituted for abandoned application Serial No. 46,510, October 24, 1935. This application January 4, 1937, Serial No. 119,035

3 Claims. (Cl. 248—324)

Our invention relates to improvements in supports for porch swings, outdoor swings, hammocks, swinging cots, "gliders," or other swinging objects. This application disclosing and claiming our invention is an application filed in substitution of our application filed October 24, 1935, Serial No. 46,510, and entitled Swing supports.

One object of our invention is to eliminate the noises usually produced by supports heretofore known and used for "gliders," porch swings, etc.

Swings of all types are usually suspended from a stationary support to which they are connected by chains or other members. As the cot, swing, or other body oscillates, the adjacent surfaces move against each other and in so doing produce creaking and squeaking noises. As the occupant of a cot or swing, in desperation lies quieter to bring about a surcease of the disturbance, the sounds may change to intermittent sharp chattering noises, depending on how the adjacent surfaces "stick" or change to periodic brief whines and wails. The conventional devices are not designed to be lubricated and if lubricated afford only a temporary relief. Many a "siesta" is thus robbed of all its benefits.

On many swinging cots and also some swings, ball bearings are used. Such bearings soon rust and thereafter "stick." The relative motion is thus in the ball bearing race and the sounds are worse than if no special provision to eliminate the noises by the use of ball bearings had been made.

If a lubricant is used with the cot or swing supports now in use, whether designed for lubrication or not, the noises are, temporarily at least, eliminated. Any lubricant has, however, the objectional quality of collecting dust and dirt. Such dust and dirt, when used with a cot, invariably soils the cot coverings, the sheets, and often the hands and wearing apparel of the user of the cot. If the lubricant is used with the hooks of a porch swing, it often drops on the seat pad and not any too seldom on a spotless piece of summer wearing apparel.

Specific objects, therefore, of our invention are to eliminate all the objectional features of the devices hereinbefore generally referred to, by the provision of a squeakless, oilless, noiseless, and frictionless swing support.

One object of our invention is to provide a supporting member for a swinging object comprising a minimum number of elements and which shall operate quietly without a lubricant.

Another object of our invention is to provide a supporting member for a swinging object, the elements of which shall coact in a substantially frictionless manner.

A still further object of our invention is the provision of a quiet greaseless accessory for supports for swinging objects.

It is also an object of our invention to provide a member for supporting a swinging object that comprises a minimum number of parts, thus permitting of its manufacture and sale at a low cost.

Other objects and advantages will become more apparent from a study of the following specification when considered in conjunction with the accompanying drawing, in which:

Figure 1 is a perspective end view of a swinging cot, or "glider" provided with our invention;

Fig. 2 is a perspective view of the embodiment of our invention of particular utility with a swinging cot;

Fig. 3 is an edge view of one of the elements of the embodiment shown in Fig. 2;

Fig. 4 is a side view of another element of the embodiment shown in Fig. 2;

Fig. 5 is an edge view of the subject matter shown in Fig. 4;

Fig. 6 is a side view of the cross pin used in our device; and

Fig. 7 is an end view of the pin shown in Fig. 6.

Referring to Fig. 1, I designates the supporting base at one end of a swing cot. The base I usually has two pair of vertically disposed end structures 2 for carrying horizontal supports 3. In the figure only one of them is shown, but it suffices to illustrate the use of our invention for one application.

The improvement itself as designed for a cot comprises a flat piece of metal or plate 4 provided with rivet or bolt holes 5. This flat piece 4 is provided at one end with a transverse pin 6. The pin 6 is securely attached to the plate 4 by welding or by means of "shrink fitting" so as to comprise a single integral unit.

The pin 6 need not necessarily be made as a separate part and then welded or shrunk into the plate. The plate 4 and pin 6 may be drop forged to thus consist of a single and integral homogeneous structure.

Regardless of the method of manufacture used, the pin portion, namely 6, of the integral element 7 comprising the plate 4 and the pin 6, consists of a pair of trunnions each having almond shaped end views which terminate at their bases, namely at the juncture of the trunnions with the plate 4, into substantially cylindrical shapes.

The transverse section of the greater portion of the length of each trunnion is almond shaped and its major axis, namely the axis from the bight portion 9 of the shape to the point portion or edge 10, depending on the point of observation, is less than the diameter of the cylindrical portion by a small fraction of the diametrical dimension. The surfaces of the trunnions at the bight portion 9 coincide with the surface of the cylindrical portion 11. Edge 10 thus falls inside of the cylindrical portion and is disposed parallel thereto.

The upper edge 10 of each trunnion adjacent the plate 4 rises in an arcuate manner as shown at 12. The description of the pin given in the preceding paragraph merely represents the preferred and probably the least expensive sectional shape, but we are not limited to the exact structure hereinbefore described. The trunnions may be triangular in section or have any other desirable sectional shapes. One of the novel results of our invention is accomplished if the trunnions have knife edges, as shown at 10, that are straight for the greater portion of their lengths but change direction upwardly, as shown in Figs. 3, 5, 6, and 7, and preferably arcuately so that the edges 10 fall within and disappear in the outer parallel surfaces of the plate 4. The purpose and function of this trunnion structure will be described later.

A U-shaped element or clevis 13, having the eyelets 14, is disposed to receive the trunnions, as shown in Figs. 1, 2, and 3.

The elements 7 are secured to the horizontal support or bar 3 as shown in Fig. 1 and a clevis 13 engages each of the elements 7 to coact with the trunnion ends of the respective elements. A link 14' having the open hook portion is designed as shown so that it can be readily hooked on the bight of the clevis.

It is readily apparent that when our improvement is used with a swinging cot or "glider" a total of eight units will be necessary and a total of four links, as 14', will be necessary to bring coacting pairs of our improvement in cooperative relation. Each link will, of course, have open hooks, as 16, at the lower ends.

The bed portion 17 of the cot carries the springs and mattress, which are not shown, and during swinging of the bed portion 17, the inner surfaces of the eyelets of the various clevises roll in a free and frictionless and quiet manner on the knife edges of the pins 6.

When the bed portion is not loaded, the inner surfaces of one or more of the clevises may, for some cause, be disposed against the face or faces of plate or plates 4 in which case flat surfaces would appear to be in frictional engagement and noises would appear to be possible. The arcuate portions 12 of each trunnion, however, at all times force the clevis 13 away from the plate 4. Our improved trunnion structure at all times tends to position the clevis 13 with reference to plate 4 as shown in Fig. 3; however, when the bed portion is loaded, the clevis is forced to the position shown in Fig. 3. Flat surfaces are, therefore, never in contact and no noises are produced.

To give a long life to the elements of our device, the coacting portions should preferably be case hardened. In view of the simplicity of our device, case hardening can be done cheaply. In addition to all the advantages of our device from the standpoint of operation, our device, according to tests, has a much longer useful life and is cheaper than devices heretofore known in this art.

We are, of course, aware of the fact that others skilled in the art, particularly after having had the benefit of the teachings of our invention, may design similar structures. We, therefore, do not wish to be limited to the particular structure shown, but wish to be limited only by the pertinent prior art and the scope of the claims hereto appended.

We claim as our invention:

1. In a support for a swing-object, in combination, a rigidly mounted member having vertically disposed substantially parallel outer faces, a pair of trunnions rigidly mounted on said member projecting at right angles to the outer faces of said member and having aligned knife edges along their upper surfaces, a U-shaped member, having eyelets at the ends of the U, adapted to engage the trunnions, the eyelets and trunnions being designed so that the U-shaped member is free to oscillate by substantially rolling contact with reference to the trunnions, means on the trunnions for maintaining the legs of the U-shaped member a given distance from the member provided with the trunnions, and means engaging the U-shaped member to support a swinging object.

2. In a support for a device, in combination, a rigidly mounted plate having vertically disposed substantially parallel outer faces, a pair of trunnions projecting at right angles from each of the outer faces and rigidly secured to the said plate, said trunnions having knife edges at their upper regions falling in the same straight line, said knife edges being straight and perpendicular to the outer parallel faces of said plate to within a short distance of the outer faces of the plate and then for the remaining short distance curve upwardly and toward the outer faces to merge into said faces, and a U-shaped member, having eyelets the inner surfaces of which are substantially cylindrical engaging the knife edges, the legs of the U-shaped member being so spaced that only a line contact is maintained between the cylindrical surfaces and the knife edges, said curved portions of the knife edges operating to maintain a given space between the legs of the U-shaped member and the parallel outer faces of the plate.

3. In a support for a swinging object the combination, of a rigidly mounted member, a pair of horizontally disposed trunnions projecting at right angles from the member, said trunnions each having a knife edge at the upper region the knife edges falling in substantially the same horizontal line for a distance near the ends of the trunnions remote from the member but curving upwardly in the region adjacent to the member so that the knife edges eventually merge with the surfaces of the member at the ends of the trunnions connected to the member, and an object engaging member having a pair of eyelets coacting with said knife edges.

AUGUST BERKOBEN.
EUGENE A. MORITZ.